United States Patent [19]
Bowers et al.

[11] 4,083,700
[45] Apr. 11, 1978

[54] NOVOLAK-ABS RESIN BINDER IN A GRINDING WHEEL

[75] Inventors: Lewis H. Bowers, Scotia; Raymond E. Jankowski, Schenectady; John L. Sullivan, Ballston Lake, all of N.Y.

[73] Assignee: Schenectady Chemicals, Inc., Schenectady, N.Y.

[21] Appl. No.: 430,539

[22] Filed: Jan. 3, 1974

[51] Int. Cl.$^2$ ................................................ C08J 5/14
[52] U.S. Cl. ................................................ 51/298 A
[58] Field of Search ................. 51/298, 299; 260/846, 260/845

[56] References Cited
U.S. PATENT DOCUMENTS

| | | | |
|---|---|---|---|
| 2,398,890 | 4/1946 | Howard | 260/846 |
| 2,422,153 | 6/1947 | Nimwegen | 51/298 |
| 2,939,777 | 6/1960 | Gregor et al. | 51/298 |
| 3,011,882 | 12/1961 | Quinan et al. | 51/298 |
| 3,536,783 | 10/1970 | Jeffreys et al. | 260/845 |
| 3,586,735 | 6/1971 | Giller | 260/846 |

FOREIGN PATENT DOCUMENTS 4,576   1/1971   Japan.

Primary Examiner—Donald J. Arnold
Attorney, Agent, or Firm—Cushman, Darby & Cushman

[57] ABSTRACT

An acrylonitrile-butadiene-styrene terpolymer is added to a phenol formaldehyde novolak to form a grinding wheel binder imparting increased flexural strength to the grinding wheel.

8 Claims, No Drawings

NOVOLAK-ABS RESIN BINDER IN A GRINDING WHEEL

The present invention relates to grinding wheels having improved novolak resin binders.

Phenol-formaldehyde novolak resins as is well known in the art are permanently thermoplastic or fusible resins prepared by condensing phenol with formaldehyde under acid conditions using about 0.5 to 1.0 moles, generally about 0.7 to 0.9 moles, of formaldehyde per mole of phenol. The resins are converted to the infusible condition by adding sufficient hexamethylenetetramine for this purpose. Such phenol-formaldehyde novolaks admixed with hexamethylenetetramine are well known as binders for abrasives, more specifically for abrasive grinding wheels.

It has now been found that the flexural strength of grinding wheels containing phenol-formaldehyde novolak resin binders can be improved by incorporating an acrylonitrile-butadiene-styrene (ABS) terpolymer into the novolak. Desirably, the ABS terpolymer is added during the manufacture of the resin. The most desirable time to add the ABS terpolymer is before the novolak is formed. Thus, the ABS terpolymer can be added during distillation, after distillation, after obtaining free formaldehyde or to the phenol before the formaldehyde is added. The latter procedure is preferred. The amount of ABS terpolymer is normally 1 to 30% based on the weight of phenol, preferably between 5 and 20%. In fact, up to 50% of the ABS terpolymer based on the weight of the phenol can be employed with some impairment of properties.

The amount of hexamethylenetetramine is not critical and can be that usually employed to cure novolak resins. Thus, there is normally employed 4.6 to 13.7% hexamethylenetetramine, preferably 6.4 to 11.9%, based on the weight of the novolak. In place of hexamethylenetetramine there can be used other conventional hardening agents for novolaks, e.g., paraformaldehydes.

Any of the conventional acids and acidic materials employed to prepare novolak resins can be employed as catalysts, e.g., sulfuric acid, oxalic acid, maleic anhydride, sulfamic acid, phenolsulfonic acid, diethyl sulfate, toluenesulfonic acid (usually employed as the commercial mixture of isomers known as TX acid) and phosphoric acid.

Any conventional abrasive grains can be employed to form the wheel. Thus, there can be used for example fused aluminum oxide, silicon carbide, diamonds, fused zirconia, sintered alumina, etc.

There can be employed commercially available ABS terpolymers, e.g., Dow 500 and Dow 300. Other suitable ABS terpolymers are those identified below as ABSON 820X13, ABSON 820X14, ABSON 820X15 and ABSON 820X16. ABSON 820X14 has a nitrogen content of 6.6% and the other ABSON terpolymers are of somewhat lower nitrogen content. Other properties of the ABSON terpolymers which are available as powders are set forth below.

| ABSON ABS TERPOLYMER PROPERTIES | | | | |
|---|---|---|---|---|
| | 820 × 13 | 820 × 14 | 820 × 15 | 820 × 16 |
| Tensile Strength (psi) | 2,900 | 6,200 | 5,500 | 5,800 |
| Ultimate Elongation (%) | 200 | 15 | 3 | 3 |
| Izod Impact Strength | | | | |
| at R.T. | 1.7 | 1.8 | 7.5 | 6.5 |
| −20° F. | 1.3 | 1.4 | 2.9 | 1.2 |
| −40° F. | 1.2 | 0.8 | 1.9 | 0.8 |
| Hardness, Rockwell R | 70 | 116 | 103 | 106 |
| Hardness, Shore D | 66 | — | 75 | 73 |
| Heat Deflection Temp. 264 psi (° F.) | 181 | 203 | 198 | 196 |
| Specific Gravity | 0.99 | 1.06 | 1.04 | 1.04 |
| Viscosity, Poises × $10^3$ Instron Rheometer (225° C) 437° F. | | | | |
| at 1000 sec$^{-1}$ | 6.7 | 3.1 | 3.4 | 3.0 |
| 100 sec$^{-1}$ | 42 | 15 | 15 | 11 |
| 10 sec$^{-1}$ | 270 | 53 | 40 | 23 |
| 1 sec$^{-1}$ | 930 | 110 | 80 | 40 |
| Solution Viscosity (Cps)* Brookfield at 20 RPM | | | | |
| 10% T.S. in THF, Initial | 640 | — | 38 | — |
| 1 day | 640 | — | 42 | — |
| 30 days | 584 | — | 50 | — |
| 10% T.S. in MEK, Initial | 9 | — | 10.5 | — |
| 1 day | 9 | — | 11.5 | — |
| 30 days | 8.5 | — | 10.0 | — |

*Values normalized with correction factors for various size spindles.

Unless otherwise indicated all parts and percentages are by weight.

EXAMPLE I

| | |
|---|---|
| A. C. P. Phenol | 2000 Parts |
| B. Oxalic Acid | 20 Parts |
| C. Abson 820 × 16 | 20 Parts |
| D. 37% Formalin | 1294 Parts |
| E. 28% Ammonia | 10.4 Parts |

Components "A" through "C" were loaded into a reaction vessel set for reflux. The components were heated to atmospheric reflux (100° C.). Component "D" was added dropwise, at reflux, to the reaction vessel over a 30–60 minute period. Enough heat was added to maintain a reflux. After all of component "D" was added, the batch was held at reflux (100° C.) until the free formaldehyde in the refluxate was less than one percent. At this point, component "E" was added to the reaction vessel and the resulting material was distilled to a grindable resin.

Ball and ring softening point = 100° C.
Yield = 1240 Parts

EXAMPLE II

| | |
|---|---|
| A. C.P. Phenol | 2000 Parts |
| B. Oxalic Acid | 20 Parts |
| C. Abson 820 × 16 | 100 Parts |

-continued

| | | |
|---|---|---|
| D. 37% Formalin | 1294 | Parts |
| E. 28% Ammonia | 10.4 | Parts |

The reaction procedure was the same as in Example I.
Ball and ring softening point = 104° C. (ASTM E 28-67)
Yield = 2160 Parts

EXAMPLE III

| | | |
|---|---|---|
| A. C. P. Phenol | 2000 | Parts |
| B. Oxalic Acid | 20 | Parts |
| C. Abson 820 × 16 | 200 | Parts |
| D. 37% Formalin | 1294 | Parts |
| E. 28% Ammonia | 10.4 | Parts |

The reaction procedure was the same as in Example I.
Ball and ring softening point = 106° C.
Yield = 2260 Parts

EXAMPLE IV

| | | |
|---|---|---|
| A. C. P. Phenol | 2000 | Parts |
| B. Oxalic Acid | 20 | Parts |
| C. Abson 820 × 16 | 400 | Parts |
| D. 37% Formalin | 1294 | Parts |
| E. 28% Ammonia | 10.4 | Parts |

The reaction procedure was the same as in Example I.
Ball and ring softening point = 113° C.
Yield = 2520 Parts

EXAMPLE V

| | | |
|---|---|---|
| A. C. P. Phenol | 2000 | Parts |
| B. Oxalic Acid | 20 | Parts |
| C. Abson 820 × 16 | 600 | Parts |
| D. 37% Formalin | 1294 | Parts |
| E. 28% Ammonia | 10.4 | Parts |

The reaction procedure was the same as in Example I.
Ball and ring softening point = 117° C.
Yield = 2635 parts

EXAMPLE VI

| | | |
|---|---|---|
| A. C. P. Phenol | 2000 | Parts |
| B. Oxalic Acid | 20 | Parts |
| C. Abson 820 × 16 | 1000 | Parts |
| D. 37% Formalin | 1294 | Parts |
| E. 28% Ammonia | 10.4 | Parts |

The reaction procedure was the same as in Example I.
Ball and ring softening point = 118° C.
Yield = 3025 Parts

EXAMPLE VII

Each of the products of Examples I through VI were ground with hexamethylenetetramine. The following formula was used to determine the ratio of hexamethylenetetramine to resin:

$$1000 \times .09 \times \frac{\text{Parts yield-parts ABS added}}{\text{parts yield}} = \frac{\text{parts hexamethylenetetramine}}{1000 \text{ parts resin}}$$

| Resin | Parts hexamethylenetetramine/1000 parts resin |
|---|---|
| Example I | 89 |
| Example II | 86 |
| Example III | 82 |
| Example IV | 76 |
| Example V | 69 |
| Example VI | 60 |

EXAMPLE VIII

The products of Examples I through VI (ground with hexamethylenetetramine as set forth in Example VII) were evaluated in grinding wheel test bars according to the following formula:

| | | PARTS |
|---|---|---|
| A. | Number 60 grit (Aluminum oxide, regular alundum) | 1625 |
| B. | SG 3513 (wetting resin, specifically an ammonia catalyzed phenol-formaldehyde resole) | 35.6 |
| C. | Grinding Wheel binder (Examples I through VI ground with hexamethylenetetramine as set forth in Example VII) | 142.5 |

The grit was added to a Hobart mixer and the SG-3513 was then added to the grit. The mixer was turned on for two minutes or until the grit was fully wetted. The binder resin was then added to the grit SG-3513 mixture and mixed for two minutes, then 323 grams of the resulting wet mix was distributed evenly into a stainless steel mold. The mixture was then pressed into a 1 × 1 × 8 inch bar on a Watson Stillman hydraulic press. The pressed bars were cured as follows:
1. 14 hours starting at ambient temperatures and to 350° F.
2. 14 hours at 350° F.
3. 12 hours going from 350° F. to ambient temperatures.

The resulting flexural bars were then broken on an Instron tester using a six inch span. Four bars were fabricated for each test. This will hold for all the data cited throughout this paper.

| | Flexural Strengths (PSI) | | |
|---|---|---|---|
| Example | Room Temperature | 300° C. | Room Temperature after 10-Day Water Soak |
| I | 5040 | 1134 | 2277 |
| II | 4941 | 1350 | 2187 |
| III | 6030 | 1332 | 2115 |
| IV | 4590 | 1394 | 1602 |
| V | 4212 | 1134 | 2502 |
| VI | 3717 | 837 | 2142 |
| *SG-3350 | 4900 | 1000 | 3200 |
| *SG-3130 | 3900 | 1700 | 2400 |

*SG-3130 is a commercial phenol-formaldehyde novolak (phenol to formaldehyde 1:0.78)
*SG-3350 is a commercial phenol-formaldehyde resin containing 10% Hycar (butadiene-acrylonitrile copolymer).
The values for SG-3130 and SG-3350 are typical values.

EXAMPLE IX

The resin in Example III was ground with various levels of hexamethylenetetramine.

| No. | Parts Resin | Parts Hexamethylenetetramine |
|---|---|---|
| 1 | 1000 | 46 |
| 2 | 1000 | 64 |
| 3 | 1000 | 82 |
| 4 | 1000 | 100 |
| 5 | 1000 | 119 |

-continued

| No. | Parts Resin | Parts Hexamethylenetetramine |
|---|---|---|
| 6 | 1000 | 137 |

These resins were then tested according to the procedures outlined in Example VIII.

| | | Flexural Strengths (PSI) | |
|---|---|---|---|
| No. | Room Temperature | 300° C. | Room Temperature after 10-Day Water Soak |
| 1 | 4950 | 540 | 1530 |
| 2 | 5562 | 657 | 2277 |
| 3 | 6003 | 1332 | 4392 |
| 4 | 5517 | 1917 | 3853 |
| 5 | 4905 | 2007 | 3375 |
| 6 | 4500 | 2430 | 3015 |

EXAMPLE X

Various catalysts were tried using the resin formulation of Example III and substituting the following catalyst loads.

| No. | Catalyst | Parts Catalyst/1000 Parts Phenol |
|---|---|---|
| 1 | Oxalic Acid | 20 |
| 2 | Maleic Anhydride | 10 |
| 3 | 85% Phosphoric Acid | 25 |
| 4 | Sulfamic Acid | 25 |
| 5 | Con. Hydrochloric Acid | 5 |
| 6 | Diethyl sulfate | 7.5 |
| 7 | Phenolsulfonic Acid | 6 |
| 8 | TX Acid | 6 |
| 9 | Con. Sulfuric Acid | 2 |

These resins were ground with 82 parts of hexamethylenetetramine per 1000 parts resin and then tested according to the procedures outlined in Example VIII.

| | | Flexural Strengths (PSI) | |
|---|---|---|---|
| No. | Room Temperature | 300° C. | Room Temperature after 10-Day Water Soak |
| 1 | 5607 | 1080 | 1827 |
| 2 | 4995 | 1017 | 1557 |
| 3 | 3447 | 1062 | 832 |
| 4 | 5887 | 1125 | 2493 |
| 5 | 5670 | 1062 | 2970 |
| 6 | 5112 | 765 | 2970 |
| 7 | 6309 | 720 | 3087 |
| 8 | 5860 | 945 | 2520 |
| 9 | 5300 | 1665 | 4050 |

EXAMPLE XI

In this example the formaldehyde/phenol mole ratio was varied while the ABS load remained constant at ten percent based on the phenol load. The procedure, materials and load outlined in Example III were used varying only the formaldehyde load.

| No. | F/P mole ratio | Ball and Ring Softening Point ° C |
|---|---|---|
| 1 | 0.69 | 103 |
| 2 | 0.71 | 100 |
| 3 | 0.73 | 102 |
| 4 | 0.75 | 106 |
| 5 | 0.77 | 108 |
| 6 | 0.79 | 112 |
| 7 | 0.81 | 117 |
| 8 | 0.83 | 112 |

These resins were ground with 82 parts hexamethylenetetramine per 1000 parts resin and then tested according to the procedures outlined in Example VIII.

| | | Flexural Strengths (PSI) | |
|---|---|---|---|
| No. | Room Temperature | 300° C. | Room Temperature after 10-Day Water Soak |
| 1 | 6020 | 1692 | 2502 |
| 2 | 6075 | 1935 | 2547 |
| 3 | 4995 | 2547 | 1872 |
| 4 | 6075 | 1377 | 2610 |
| 5 | 4860 | 1845 | 1800 |
| 6 | 4617 | 1575 | 1575 |
| 7 | 5391 | 1377 | 2187 |
| 8 | 4725 | 1800 | 1557 |

EXAMPLE XII

In this example various ABS resins were utilized at weight for weight substitution in the formulation outlined in Example III.

| No. | ABS Used | Manufacturer | Ball and Ring Softening Point ° C |
|---|---|---|---|
| 1 | 820 × 13 | B.F. Goodrich Chemical Co. | 111 |
| 2 | 820 × 14 | B.F. Goodrich Chemical Co. | 109 |
| 3 | 820 × 15 | B.F. Goodrich Chemical Co. | 114 |
| 4 | 820 × 16 | B.F. Goodrich Chemical Co. | 103 |
| 5 | Dow 500 | Dow Chemical Co. | 105 |
| 6 | Dow 300 | Dow Chemical Co. | 107 |

These resins were ground with 82 parts hexamethylenetetramine per 1000 parts resin and then tested according to the procedures outlined in Example VIII. No. 4 had the best properties and No. 1 the second best properties.

| No. | Room Temperature Flexural Strengths (PSI) |
|---|---|
| 1 | 5980 |
| 2 | 5152 |
| 3 | 5328 |
| 4 | 6120 |
| 5 | 3978 |
| 6 | 4563 |

EXAMPLE XIII

| A. C.P. Phenol | 2000 Parts |
|---|---|
| B. Oxalic Acid | 20 Parts |
| C. 37% Formalin | 1294 Parts |
| D. Abson 820 × 16 | 200 Parts |
| E. 28% Ammonia | 10.4 Parts |

Materials "A" and "B" were loaded into a reaction vessel set up for atmospheric reflux and heated to 100° C. Material "C" was added at 100° C. over a 30 to 60 minute period. The reaction mixture was then held at 100° C. (atmospheric reflux) until the free formaldehyde level of the refluxate was less than one percent. Materials "D" and "E" were added and the resulting resin was distilled to a grindable resin.

Ball and ring softening point = 111° C.

EXAMPLE XIV

Load: Same as Example XIII.

Materials "A" and "B" were loaded into a reaction vessel set up for atmospheric reflux and heated to 100° C. Material "C" was added at 100° C. over a 30 to 60 minute period. The reaction mixture was then held at 100° C. (atmospheric reflux) until the free formaldehyde level of the refluxate was one percent or less. Material "E" was added. The resulting resin was distilled atmospherically to 130° C. Material "D" was added and the resin was then distilled to a grindable resin.

Ball and ring softening point = 108° C.

EXAMPLE XV

Load: The same as Example XIII.

Materials "A" and "B" were loaded into a reaction vessel set up for atmospheric reflux and heated to 100° C. Material "C" was added at 100° C. over a 30 to 60 minutes period. The reaction mixture was then held at 100° C. until the free formaldehyde in the refluxate was less than one percent. Material "E" was added. The batch was then distilled to a grindable resin. Material "D" was then added and mixed in.

Ball and ring softening point = 111° C.

EXAMPLE XVI

| A. C.P. Phenol | 2000 Parts |
| --- | --- |
| B. Oxalic Acid | 20 Parts |
| C. 37% Formalin | 1294 Parts |
| D. 28% Ammonia | 10.4 Parts |

Materials "A" and "B" were added to a reaction vessel set for atmospheric reflux and heated to 100° C. Material "C" was added at 100° C. over a 30 to 60 minute period. The reaction mixture was held at 100° C. until the free formaldehyde in the refluxate was less than one percent. Material "D" was added and the resin was distilled to a grindable resin.

Ball and ring softening point = 102° C.

EXAMPLE XVII

The resins from Examples III, XIII, XIV, XV, and XVI were ground with 82 parts hexamethylenetetramine per 1000 parts resin.

Flexural bars were prepared from the powdered resins in Examples III, XIII, XIV, and XV using the procedures outlined in Example VIII. Flexural bars were also prepared from the powdered resin in Example XVI using two minor modifications of the procedure outlined in Example VIII.

XVI-A, 10 parts Abson 820X16 per 100 parts powdered resin were blended during the grind. The resulting mixture was utilized as part "C" in the test procedure outlined in Example VIII.

XVI-B, 10 parts Abson 820X16 per 100 parts resin was added to the formulation described in Example VIII.

| Example | Room Temperature Flexural Strengths (PSI) |
| --- | --- |
| III | 6030 |
| XIII | 5373 |
| XIV | 5220 |
| XV | 4707 |
| XVI-A | 3897 |
| XVI-B | 3555 |

EXAMPLE XVIII

| A. C. P. Phenol | 1000 Parts |
| --- | --- |
| B. Oxalic Acid | 20 Parts |
| C. Abson 820 × 16 | 100 Parts |
| D. 37% Formaldehyde | 647 Parts |

The phenol and oxalic acid were added to the reaction vessel along with the ABS and melt blended at elevated temperatures. When the melt blend has been completed the formaldehyde is added dropwise and taken to a final free formaldehyde of zero percent. The resulting condensate is distilled to a grindable resin, ground with hexamethylenetetramine and utilized as a grinding wheel binder.

Listed below are the results on an ABS modified grinding wheel binder along with the results on a general purpose resin (SG-3130) and two high performance novolak resins, SG-3350 (Hycar modified) and SG-3378 (epoxy modified). The water soak samples were immersed for ten days prior to flexural strength determination.

| | Flexural Strength (PSI) | | |
| --- | --- | --- | --- |
| Resin (#) | Room Temperature | 300° C. | Room Temperature after Water Soak |
| Example XVIII | 6120 | 1710 | 3573 |
| 3350 (Hycar) | 4734 | 1197 | 2457 |
| 3130 | 3690 | 1755 | 2205 |
| 3378 | 3780 | 1845 | 1440 |

Resin 3378 had 15% of Epon 1007 (bisphenol A-epichlorohydrin resin, Mol. Wt. 2000-2500) as a modifier to the novolak.

What is claimed is:

1. A grinding wheel comprising abrasive grits bonded with a bonding agent which is a blend of an acrylonitrile-butadiene-styrene terpolymer resin and a hardened phenol-formaldehyde novolak, said terpolymer being present in an amount of 1 to 50% based on the phenol in the novolak, the phenol being phenol per se.

2. A grinding wheel according to claim 1 wherein the bonding agent is prepared by adding the terpolymer during the formation of the novolak.

3. A grinding wheel according to claim 2 wherein the novolak is hardened with hexamethylenetetramine.

4. A grinding wheel according to claim 2 wherein there is present in the bonding agent 1 to 30% of the terpolymer based on the phenol in the novolak.

5. A grinding wheel according to claim 4 wherein there is present in the bonding agent 5 to 20% of the terpolymer based on the phenol in the novolak.

6. A grinding wheel according to claim 1 wherein novolak is hardened with hexamethylenetetramine.

7. A grinding wheel according to claim 1 wherein there is present in the bonding agent 1 to 30% of the terpolymer based on the phenol in the novolak.

8. A grinding wheel according to claim 7 wherein there is present in the bonding agent 5 to 20% of the terpolymer based on the phenol in the novolak.

* * * * *

Disclaimer 4,083,700.—*Lewis H. Bowers*, Scotia, *Raymond E. Jankowski*, Schenectady, and *John L. Sullivan*, Ballston, Lake, N.Y. NOVOLAK-ABS RESIN BINDER IN A GRINDING WHEEL. Patent dated Apr. 11, 1978. Disclaimer filed June 11, 1979, by the assignee, *Schenectady Chemicals, Inc.*

Hereby enters this disclaimer to claims 1, 6, 7 and 8 of said patent.

[*Official Gazette September 4, 1979.*]